United States Patent [19]

Kenworthy

[11] 4,154,640

[45] May 15, 1979

[54] STENCIL TABBING MACHINE

[75] Inventor: Grant F. Kenworthy, Des Plaines, Ill.

[73] Assignee: Weber Marking Systems, Inc., Arlington Heights, Ill.

[21] Appl. No.: 857,680

[22] Filed: Dec. 5, 1977

[51] Int. Cl.[2] ........................ B32B 31/04; B65C 11/04

[52] U.S. Cl. ........................................ 156/552; 156/578

[58] Field of Search ......................... 156/578, 552, 519

[56] References Cited

U.S. PATENT DOCUMENTS

| | | | |
|---|---|---|---|
| 3,457,131 | 7/1969 | Rosenstein | 156/578 |
| 4,104,983 | 8/1978 | Carstedt | 156/578 |
| 4,120,711 | 10/1978 | Gudeman | 156/578 |

*Primary Examiner*—Douglas J. Drummond

*Attorney, Agent, or Firm*—Kenneth T. Snow

[57] ABSTRACT

A machine receiving a continuous strip of multileaved business forms and carrying the forms across the machine in indexed increments. Applying a liquid adhesive at a first station in the machine to the top surface of one of the forms at a desired location thereon. Identically repeating the liquid adhesive deposition on each form as the forms are indexed through the machine and across the first station. Applying a stencil at a second, spaced apart station in the machine to each of the forms at the location of the liquid adhesive for holding the stencils to the business forms. Discharging the stencil tabbed business forms in a continuous strip from the machine.

1 Claim, 18 Drawing Figures

STENCIL TABBING MACHINE

BACKGROUND OF THE INVENTION

1. Field of the Invention

Many years ago Weber Marking Systems, Inc., the assignee of the present application, and its predecessors pioneered in the development of utilizing a removably attached stencil over the address portion of a multileaved invoice form whereby one typing of the customer's name and address completed the addressing of the invoice and the making of a stencil used to address the packages comprising the shipment. This one typing eliminated the error of having goods shipped to one address and sending the invoice to a different address. Weber Marking Systems, Inc. has experimented with many types of adhesives in their removable attachment of stencils to plural leaved invoice forms. Both the adhesives and the stencils contained oils and with the passage of time these oils tended to "bleed" and contributed to a staining of the invoice forms. Weber Marking Systems, Inc. discovered that by using a pressure sensitive adhesive tape to hold the stencil to the paper form there was a minimum of oil bleed onto the paper form. A novel tabbing machine was developed and this is disclosed in Weber Marking Systems, Inc. U.S. Pat. No. 3,052,284.

However, there were and are drawbacks to the tabber utilizing a separate tape to attach the stencil to the forms to be addressed. Shelf life of such stencil tabbed forms is relatively short and hence the forms with stencils tabbed thereto cannot be made up in advance of their intended use. Also, stencils having a pressure sensitive adhesive tape at one end thereof makes such a stencil roll special. And still further such special stencil rolls are bulky at the one end and not the other making it difficult to make uniformly wound rolls.

The present invention aids in overcoming some of the inadequacies of the existing tabbing system with tape adhered stencils. The adhesive utilized is preferably a non-oily wax which securely holds a stencil without smearing or causing oil bleedout to the form to which the stencil is attached. The stencils may be of standard construction without the use of bulky tape. And, effective shelf life of these wax held stencils is considerably longer than those heretofore used.

The present invention is concerned with a machine for tabbing a stencil to a continuous strip of plural leaved business forms which are incrementally indexed through the machine. A liquid adhesive such as a microcrystalline wax is deposited in a desired pattern at a particular location on the plural leaved business forms at a first station on the machine. The machine utilizes an adhesive applicator which is moved upwardly and downwardly in synchronism with the indexing of the business forms and when the applicator is in a down, form engaging position, it acts to deposit the adhesive on the forms. The adhesive applicator is adjustably positioned over the area of the first station on the machine so that it may deposit adhesive at any location on the business form. The machine is capable of having the adhesive repetitively deposited in the same location on each form as it passes the first station in the machine. Subsequently a stencil, without any tape or other adhesive, is delivered over the plural leaved business forms at a second station on the machine and thereupon placed onto the previously laid adhesive to cause the stencil to be attached to the business form. The stencil delivery mechanism may be similarly adjusted at the second station and the stencil deposited at the same location on the form where the adhesive was previously deposited. The machine thus delivers stencil tabbed business forms in a continuous strip. The use of wax as the adhesive permits the subsequent stripping of the stencil from the form.

2. Description of the Prior Art

A preliminary patent search was made on the subject liquid application and the following prior U.S. Pat. Nos. were found: Talarico 3,344,767; Lockwood 3,348,520; Maniaci 3,642,556; Schweitzer 3,768,439; Baker et al. 3,811,405; Carlyle 3,818,924.

Most of the above listed prior patents show and describe mechanisms for dispensing adhesives or other liquids in various patterns. Some of these patented devices employ valved trap chambers to dispense uniform amounts of liquid on each ejection. Still further some of these prior patented devices also employ heating chambers to melt the liquids before they are dispensed.

All of these prior patents fail to disclose the principles of applicant's invention as disclosed herein.

SUMMARY OF THE INVENTION

A principal object of this invention is to provide a novel stencil tabbing machine in which a liquid adhesive is deposited at a first station therein onto the surface of a business form being indexed therethrough as a part of a continuous strip, and a stencil is deposited on the adhesive at a second subsequent station in the machine for the purpose of attaching the stencil to the business form.

An important object of this invention is to provide a novel carriage for a liquid adhesive applicator which is reciprocably moved up and down on the machine in timed relation with the indexing of a continuous strip of plural leaved business forms through the machine and permitting the deposition of an adhesive to the business forms when the applicator is in a down position engaging the top surface of the business forms.

Another important object of this invention is to provide in a machine for tabbing a stencil to a business form a novel carriage for a liquid adhesive applicator which permits unlimited adjustment of the applicator relative to the carriage so the applicator may deposit its liquid adhesive at any location over the full area of the business form.

Still another important object of this invention is to provide a novel stencil tabbing machine in which a liquid adhesive applicator is regularly vertically reciprocated and is adjustable both fore and aft and transversely within the machine without in any way disturbing the reciprocable drive means.

Other and further important objects and advantages will become apparent in the following description and the accompanying drawings.

IN THE DRAWINGS

AS SHOWN IN THE DRAWINGS

Figure 1:
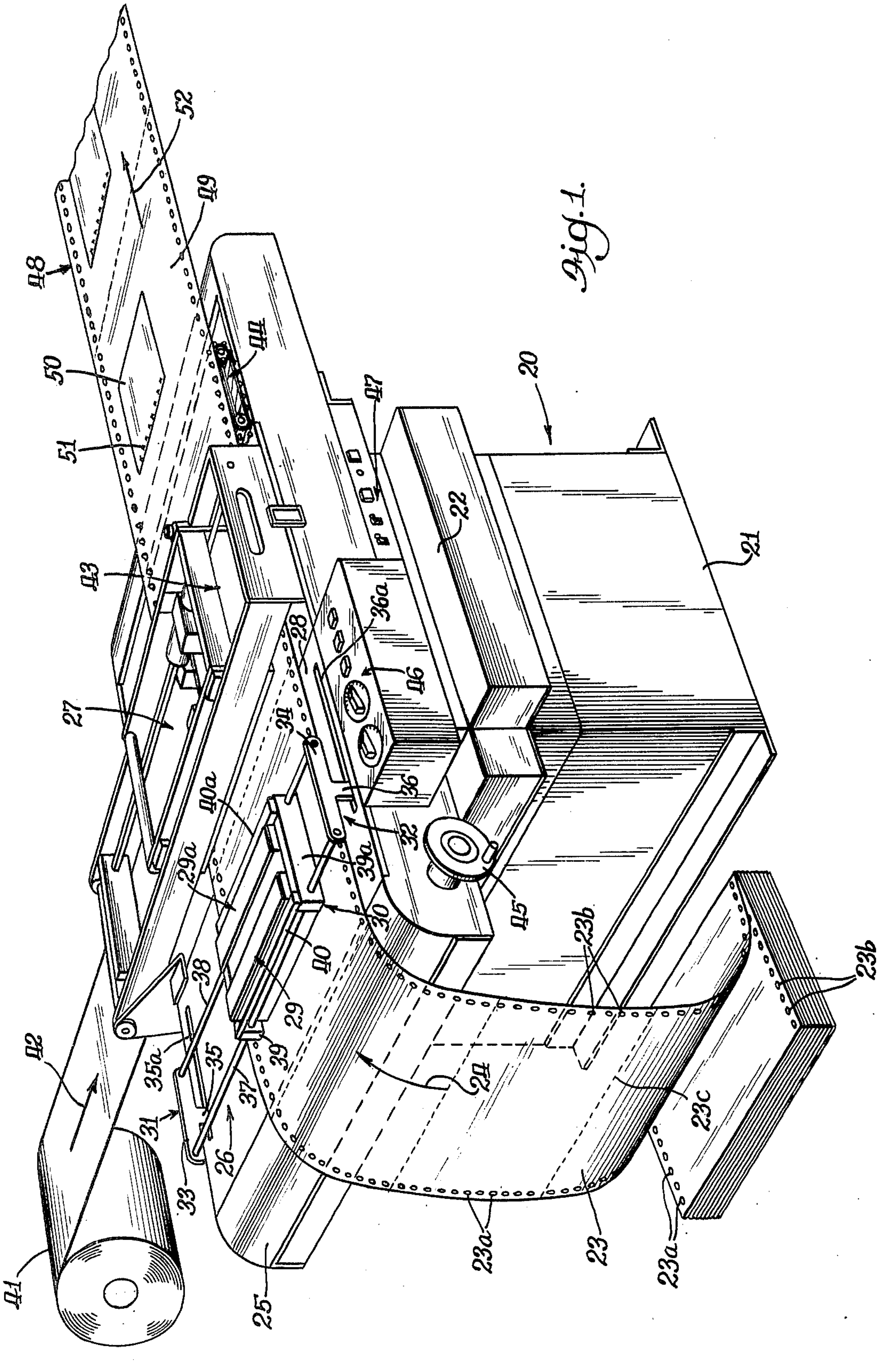
FIG. 1 is a perspective view of the stencil tabber of this invention.

The reference numeral 20 indicates generally a main frame for the stencil tabbing machine of this invention. The machine frame comprises a base 21 and a table portion 22. In use, the machine takes a stack of plural leaved paper business forms in a continuous series, identified by the numeral 23, and tabs a stencil to each of the defined business forms. As a rule the previously made business forms are provided in fanfolded stacks and it is from a stack such as this that the forms 23 are fed into the machine. The forms 23 are equipped with regularly spaced apart holes along each side margin as shown at 23*a* and 23*b*. It is by these margin holes that the forms are fed by engagement with a drive element to be later described. The forms 23 are further equipped with transverse perforations 23*c* to define individual forms. The arrow 24 shows the direction of entry of the forms into the machine. The forward end of the table is provided with a curved sheet 25 to guide the entrance of the business forms 23 in a smooth arc into the machine. A first area is designated as station 26 and then a second longitudinally spaced apart area is designated as station 27. A flat bed 28 is provided on the table 22 on a level with the upper inner end of the curved guide 25. It is on this bed 28 that the business forms are adapted to receive an application of adhesive at the first station 26 and the tabbing of a stencil onto that adhesive at the second station 27.

A liquid adhesive applicator 29 is positioned over the bed 28 at the location of the first station 26. Similarly a duplicate adhesive application 29*a* is provided at this first station in a tandem relationship with the first adhesive applicator 29. In many instances only one applicator would be employed but in the event it is desired to apply adhesive to more than one location on the business forms 23 the two applicators would be utilized. It might be desirable to use two applicators to fasten the stencils to the forms along opposite edges thereof so that the stencil would not be allowed to fold backwardly or under in the fanfolding collection of the tabbed business forms as the forms leave the machine.

As further shown in FIG. 1 the liquid adhesive applicators are mounted on an adjustable carriage 30. The carriage 30 includes spaced apart vertically disposed T-members 31 and 32. The T-members are provided with top cross bars 33 and 34 which are disposed parallel to each other and are located at opposite sides of the machine. Each T-member is further provided with a vertical post like member 35 and 36 respectively. These vertical members 35 and 36 are adapted to pass downwardly through the flat bed 28 in respective elongated slots 35*a* and 36*a*. The carriage 30 is further provided with transversely disposed parallel rods 37 and 38 which join the ends of the top cross bars 33 and 34 of the T-members. These rods span the width of the machine and are adapted to slidably carry spaced apart blocks 39 and 39*a* therealong. Transverse tie members 40 and 40*a* join the blocks 39 and 39*a* along the front and rear respectively to form a support frame. It is to this support frame of members 39 and 39*a* and 40 and 40*a* that the liquid applicators 29 and 29*a* are carried and shifted on the rods for effecting the transverse adjustment of the applicators 29 and 29*a* over the bed 28 of the machine.

A continuous strip supply of stencils 41 are delivered to the machine from the far side thereof in the direction of the arrow 42. These stencils 41 come into the machine at the location of the second station 27. A stencil cut-off and placement mechanism 43 acts to cut, convey and deposit a severed stencil 41 onto the liquid adhesive previously applied on the plural leaved business forms at the first station 26.

Form drive tractors 44, each comprising an endless chain with short radial pins thereon, located at the far end of the machine beyond the second station, act to pull the continuous strip of business forms 23 through the machine. The drive tractors have their radial pins engage the margin holes 23*a* and 23*b* of the business forms 23 and cause the forms to be advanced a uniform distance in an indexing manner.

An adjustable control wheel 45 is provided near the forward end of the machine for effecting a shifting of the carriage 30 in a longitudinal direction within the machine. An electrical control panel 46 is mounted on the table 22 adjacent to one side of the bed 28 and is utilized to effect a starting, stopping and jogging of the drive mechanisms of the machine. A second electrical control panel 47 is provided adjacent the first panel to effect the energizing or turning off of the heater for the liquid adhesive.

The stencil tabbed business forms exiting from the far end of the machine are designated by the numeral 48. The tabbed forms include a plural leaved paper business form 49, a stencil 50 on the form, and a line of adhesive 51 indicating the attachment of the stencil to the form. An arrow 52 shows the direction of exit of the stencil tabbed forms 48 from the machine of this invention.

The carriage 30 by reason of its fore and aft adjustability throughout the length of the elongated slots 35*a* and 36*a* and the transverse adjustability of the support frame 39, 39*a*, 40 and 40*a* on the rods 37 and 38 permit the liquid adhesive applicators to be placed in any desired position over the area of the first station 26. This means that the adhesive can be placed on any selected area of the business form where it is desired to have the stencil tabbed. And, similarly the second station with its stencil placement mechanism 43 may deposit the stencil whereever desired to match the glue placement.

Figure 2:
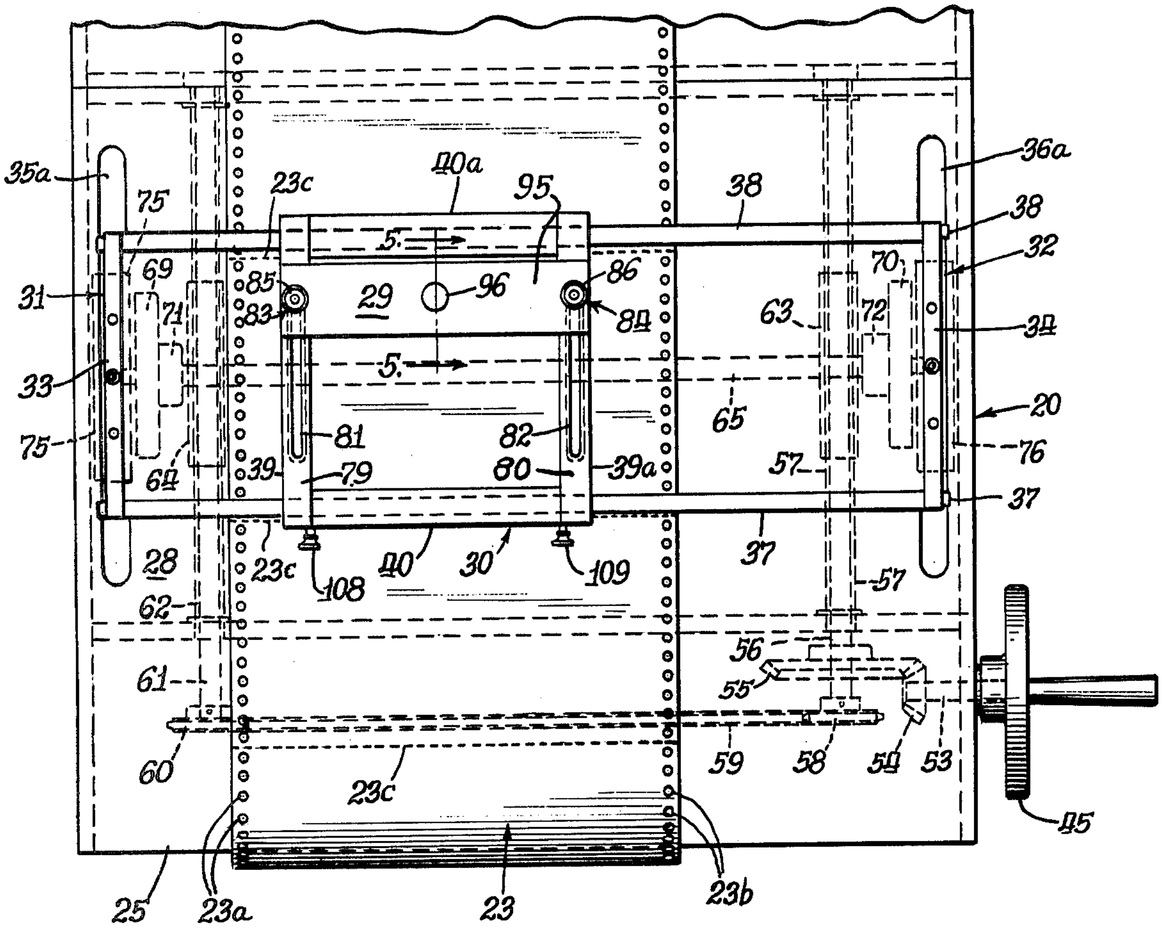
FIG. 2 is an enlarged top plan view of a portion of the forward end of the stencil tabber of this invention.
Figure 3:
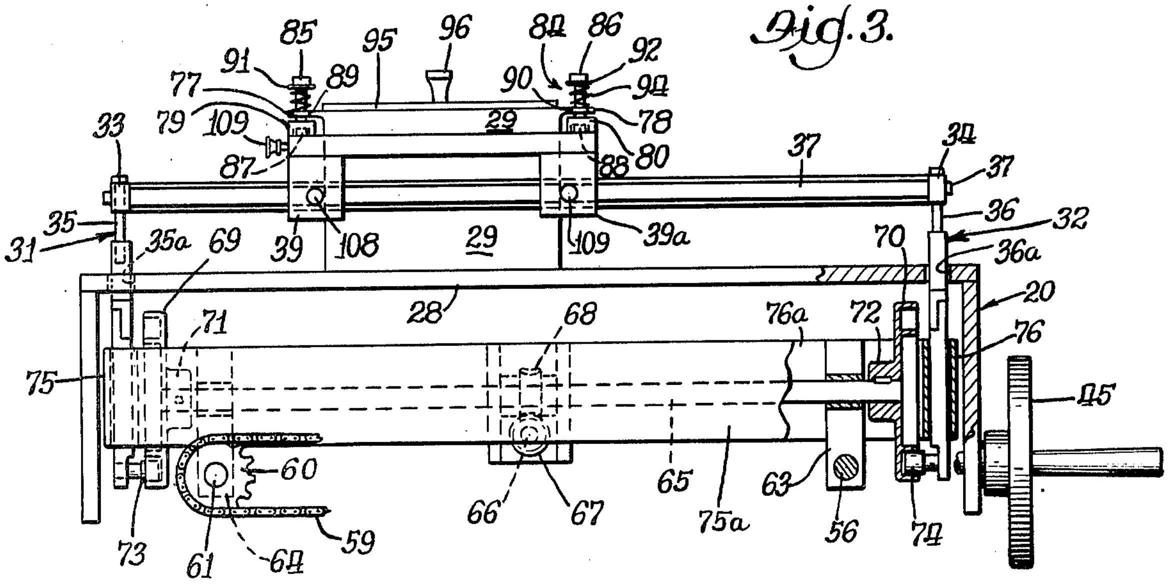
FIG. 3 is a front elevational view of a portion of the machine as shown in FIG. 2 with parts thereof broken away to show the interior.
Figure 4:
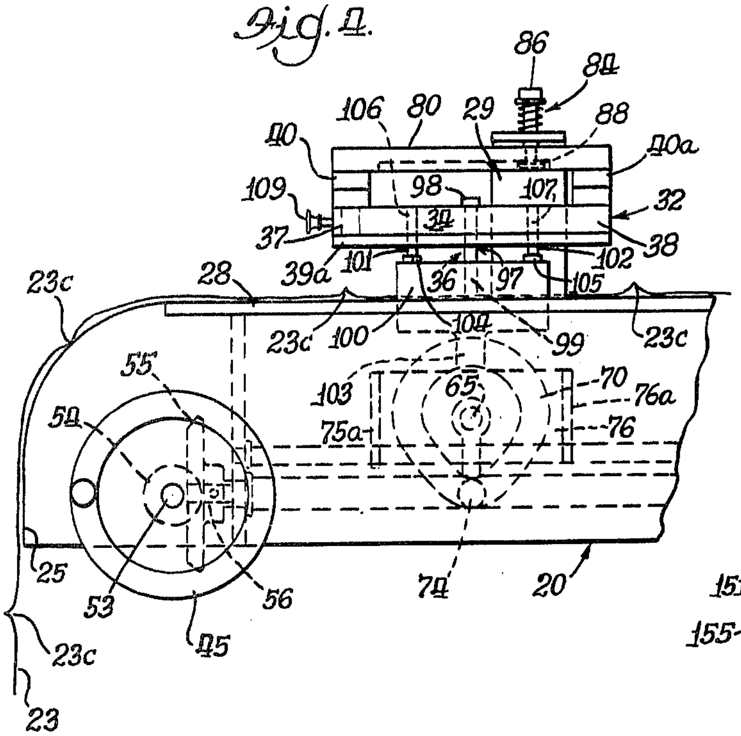
FIG. 4 is a side elevational view of a portion of the machine as shown in FIGS. 2 and 3.

As best shown in FIGS. 2, 3 and 4, the handwheel 45, utilized to effect the fore and aft longitudinal shifting of the liquid adhesive applicator carriage 30, is provided with a shaft 53 which is journally mounted in the frame 20. The inner end of the shaft 53 is equipped with a bevel pinion gear 54 which is in engagement with a larger bevel gear 55 disposed at right angles thereto. The large bevel gear 55 is mounted on a shaft 56 which is disposed longitudinally and journally supported in the machine of this invention. The shaft 56 is provided over a major portion of its length with a right hand lead screw 57. A sprocket 58 is mounted on the forward end of the shaft 56 and by means of a chain 59 extending transversely of the machine, drive from the sprocket 58 is delivered to a spaced apart sprocket 60 which receives the other end of the chain 59. The sprocket 60 is mounted on a shaft 61 disposed longitudinally and journally supported within the machine. The shaft 61 is spaced apart from and lies parallel to the shaft 56. The shaft 61 is provided with a right hand lead screw portion 62 over the area similar to that of the lead screw portion of the shaft 56. A block 63 threadedly engages the lead screw portion 57 of the shaft 56. A block 64 threadedly engages the lead screw portion 62 of the shaft 61. The spaced apart blocks 63 and 64 are adapted to journally receive a transversely disposed cam shaft 65.

A splined drive shaft 66 is disposed longitudinally and generally centrally of the machine. The splined drive shaft 66 receives its rotational power from the main drive of the machine which is not shown. A first helical gear 67 is slidably mounted on and rotatably driven on the drive shaft 66 and is in cooperative engagement with a right angularly disposed helical gear 68 mounted on and affixed to the cam shaft 65. These helical gears 67 and 68 cooperate with each other to deliver rotational drive from the shaft 66 upwardly to the cam shaft 65. This drive continues regardless of the longitudinal positioning of the applicator carriage 30 by reason of the capability of the helical gears to slide on the splined drive shaft 66.

Track type annular cams 69 and 70 are provided with hubs 71 and 72 respectively which are mounted on opposite ends of the cam shaft 65. Thus, as the cam shaft 65 is rotated through the helical gears from the driving shaft 66, so also will the track cams be rotated. Cam rollers 73 and 74 are mounted respectively on the lower ends of the vertical members 35 and 36 of the T-members 31 and 32. These cam rollers 73 and 74 engage the track cams 69 and 70 respectively, and on rotation of the track cams act to cause a rising and falling of the applicator carriage mechanism. Guide members 75 and 76 are provided within the machine adjacent the cam driving elements to maintain the rise and fall shafts 35 and 36 in a vertical disposition during this operational movement. The guide sleeves 75 and 76 are joined by support frames 75*a* and 76*a* which carry the cam drive. These bridging support frames 75*a* and 76*a* move fore and aft within the machine by the lead screws 57 and 62 and thus move unitarily with the fore and aft movement of the carriage 30 and its liquid applicator 29. The blocks 63 and 64 are mounted on and form a part of the support frames 75*a* and 76*a*. It is this rise and fall movement of the applicators that causes the liquid adhesive applicator to be moved from an upward inactive position to a position down and in engagement with the surface of the business forms to which the liquid is to be applied. When in a down position the liquid adhesive is discharged at a time when the business forms are in a stationary state between its intermittent incremental indexing movement. Conversely when the applicator is spaced above the plural leaved business form 23 there is no liquid discharge and there is adequate room for the indexing advancement of the business forms by the drive tractors 44.

The manual turning of the hand crank 45 thus effects concurrent and uniform rotation of both of the right hand lead screws 57 and 62. This lead screw rotation results in the fore and aft movement of the carriage 30 and its liquid applicator 29 above the bed 28 and a corresponding fore and aft movement of the cams and cam drive mechanism below the surface of the bed 28. There is no interruption of the drive for the vertical reciprocation of the carriage and the liquid applicator because the drive thereto remains intact by reason of the slidability of the helical gear 67 on the splined drive shaft 66. Thus as the longitudinal adjustment is made by rotating the handwheel 45 the helical gears 67 and 68 remain in cooperative engagement.

As best shown in FIGS. 3 and 4 the applicator 29 has at its top, a projecting flange 77 from one end thereof and a similar flange 78 projecting from the other end thereof. These flanges 77 and 78 act to carry the applicator 29 on the adjustable carriage 30. A fore and aft disposed bar 79 is mounted on the carriage at a position spaced above the rod sliding bar 39. The bar 79 is mounted on and spans the transversely extending frame members 40 and 40*a* and thus forms an integral part of the carriage 30. A similar fore and aft extending bar 80 is mounted on the other ends of the transversely disposed frame members 40 and 40*a* in a position spaced above and parallel to the rod sliding bar 39*a*. The bar 79 is provided with an elongated slot along its central portion and similarly the bar 80 is provided with a comparable centrally disposed elongated slot 82. A bolt 83 is adapted to pass through the superposed applicator flange 77 and the bar 79. A similar bolt 84 is adapted to pass through the superposed applicator flange 78 and the bar 80. The bolt 83 is provided with an enlarged head 85 at the top thereof and similarly the bolt 84 is provided with an enlarged head 86. A nut 87 engages the threaded shank of the bolt 83 at the bottom thereof beneath the bar 79. A nut 88 threadedly engages the shank of the bolt 84 beneath the bar 80. The bolts 83 and 84 pass through the flanges 77 and 78 respectively as previously stated and thereupon pass through the elongated slots 81 and 82 respectively of the bars 79 and 80. In order to permit the bolts to pass through the applicator flanges, holes 89 and 90 are provided in the flanges 77 and 78 respectively. The holes 89 and 90 are sufficiently large to loosely and freely receive the bolts 83 and 84. A large diameter washer 91 is mounted on the bolt 83 beneath the head 85. Another large diameter washer 92 is mounted on the bolt 84 beneath its head 86. A spring 93 is disposed between the large diameter washer 91 and the top surface of the flange 77 of the applicator. A spring 94 is disposed between the large diameter washer 92 and the top surface of the flange 78 at the other end of the applicator 29. The elongated slots 81 and 82 thus provide the applicator 29 with an adjustability throughout a longitudinal range of the length of the slots within the stencil tabber of this invention. Similarly, if more than one applicator is desired to be employed such as 29 and 29*a* as shown in FIG. 1 the relative positioning of the applicators on the carriage 30 may be changed as desired by moving the applicators within the range of the elongated slots. If, as in the present instance, the applicators are utilized to deposit a liquid adhesive in a desired pattern on some surface, the adhesive deposits of the two applicators may be arranged so that the spacing may be set as desired.

The applicator 29 is provided with a cover 95 having a knob handle 96 substantially in the center thereof. The cover is adapted to enclose the adhesive storage chamber within the applicator and thus prevent dust or other contaminants from reaching the liquid adhesive.

FIG. 1 discloses the T-members 31 and 32 and their respective top cross bars and vertical members as simple uncomplicated members. In FIGS. 2, 3 and 4 these T-members are shown in much more sophisticated form. The vertical member 36, for example, as best shown in FIG. 4, includes a bolt member 97 passing through the top bar 34 of the T-member. This bolt 97 has a head 98 abutting the top surface of the cross bar 34. A threaded shank 99 of the bolt member 97 is adapted to threadedly engage a block-like member 100. A pair of height adjusting and levelling screws 101 and 102 flank the sides of the centrally disposed bolt 97. The block-like member 100 is provided with a centrally depending arm 103 which at its lower end carries the cam roller 74. The screws 101 and 102 are provided with heads 104 and 105 and threaded shanks 106 and 107 respectively which threadedly engage the cross head 34 of the T-member 32. With this construction the several screws and bolt 97, 101 and 102, the vertical portion 36 of the T-member may have its overall length adjusted by the greater or lesser threaded engagement of the screw shanks with the T-cross head 34 and the greater or lesser threaded engagement of the bolt shank with the intermediate block-like member 100. Further, these screws 101 and 102 may be adjusted to level the T-member and particularly position the member 36 in a truly vertical position. This vertical member 36 thus constitutes the bolt 97, the block-like member 100 and the depending arm 103.

As best shown in FIGS. 2, 3 and 4 the carriage 30 is provided with thumb screws 108 and 109 which threadedly engage respectively the front faces of the block members 39 and 39*a*. When these thumb screws are loosened the carriage 30 may be manually shifted transversely along the parallel rods 37 and 38 and when the desired position of the carriage is obtained the thumb screws are then tightened so that the carriage 30 is locked relative to the transverse rods 37 and 38 on which it is slidably adjustable.

The applicator 29 includes a liquid reservoir or storage chamber 110 at its top. A liquid adhesive 111 is shown within the storage chamber in FIGS. 5 through 12. In the present instance the liquid adhesive is a wax and it is wax which is used to hold a stencil to a multi-leaved business form. A gasket 112 is interposed between the bottom of the storage chamber 110 and an upper manifold 113 which is disposed directly beneath the liquid reservoir. A plurality of screws 114 are adapted to pass through the bottom of the storage chamber 110, through the gasket 112 and into a threaded engagement with the top of the upper manifold 113 to thereby hold the storage chamber and manifold in fixed relationship. A heating element 115 is housed in the upper manifold 113 at a position closely adjacent the liquid reservoir 110 to thereby impart sufficient heat to keep the wax 111 in a liquid state during use of the machine of this invention.

The upper manifold 113 is provided with a centrally disposed well 116 opening directly into the storage chamber 110 so that molten wax or other liquid adhesive may flow down into this well. A piston 117 is carried within the lower portion of the well 116. The piston 117 houses an upper check valve 118. The check valve 118 is provided with a vertically disposed downwardly extending shank 119 having an enlarged circular shoulder 120 at its upper end. Above the circular shoulder there is provided a centrally disposed upstanding post 121 which has an elastomer "O" ring 122 snuggly engaged therearound. A spring 123 surrounds the cylindrical shank 119 with its upper end abutting the enlarged circular shoulder on its under side. The spring is arranged to urge the check valve upwardly. The piston 117 is provided with a vertical central passageway 124 extending from the top to the bottom thereof. The central passageway 124 has a conical or inwardly tapering upper portion 125. It is against this inwardly tapering portion 125 that the check valve acts to either close or open the passageway 124 at desired times during the operation of the stencil tabber of this invention. A retainer or guide 126 is fixedly provided in the lower end of the piston 117 within the vertical passageway 124 and acts to guide the cylindrical shank 119 of the check valve in its vertical reciprocation. The retainer 126 is in turn provided with a central passageway 127 so that when the check valve 118 has permitted wax or other liquid adhesive to move downwardly into the central passageway 124 of the piston it can then pass downwardly around the cylindrical shank 119 and within the retainer passageway 127.

Figure 5:
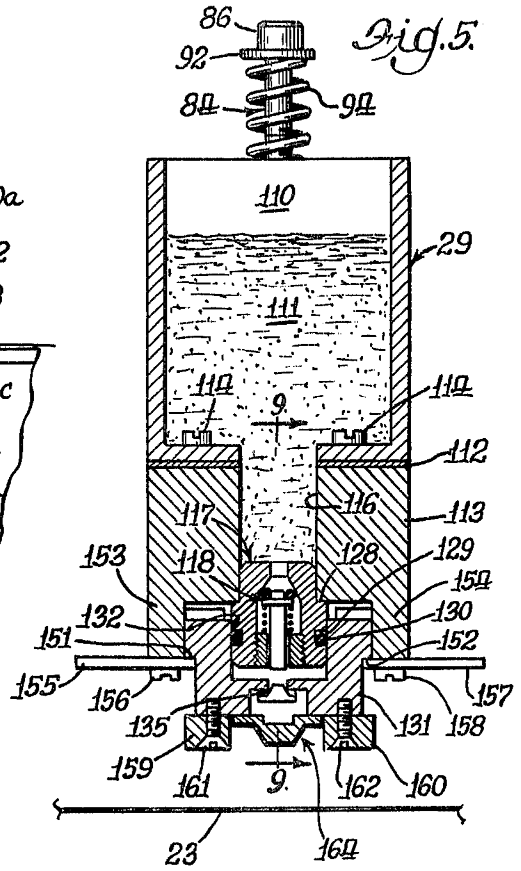
FIG. 5 is a sectional view taken on the line 5—5 of FIG. 2.

An enlarged annular shoulder 128 is provided on the piston 117 which abuts the underside of the upper manifold 113 as shown in FIG. 5. The lower, larger diameter portion of the piston 117 is provided with an annular groove 129 in its outer cylindrical wall. This groove houses an elastomer "O" ring 130, also shown in FIG. 5. The applicator is further provided with a lower manifold 131 which has a circular well 132 in its central portion which is of slightly larger diameter than the well 116. The lower manifold 131 slides vertically on the lower portion of the piston 117. The rubber or other elastomer "O" ring 130 acts to liquid seal the vertical sliding movement of the lower manifold 131 relative to the piston 117. The lower manifold 131 is provided with a small central hole 133 in its lower end thereof in alignment with the central well 132. A chamber 134 having its extent defined by the under surface of the piston 117 and the small central hole 133 is used as a wax or other liquid adhesive metering chamber for the dispensing of adhesive in the applicator of this invention.

A lower check valve 135 is arranged and constructed to effect an opening or a closing of the small central hole 133. The check valve 135 comprising a strip of rubber or other elastomer material is best shown in the construction depicting FIG. 9 and the operational FIGS. 10, 11 and 12. The strip is provided with a pad 136 at one end and a pad 137 at its other end. These relatively thick end pads 136 and 137 are joined by a thinner central portion 138. It is the central portion 138 that is provided with the valve proper in the form of a conical point or projection 139. The conical projection acts to engage the opening 133 to seal off the wax chamber 134 at certain desired times and under certain operating conditions. The check valve 135 has its end pad 136 bonded at 140 to the underside of the lower manifold 131. Similarly the other end portion 137 is bonded at 141 to the underside of the lower manifold 131.

Figure 6:
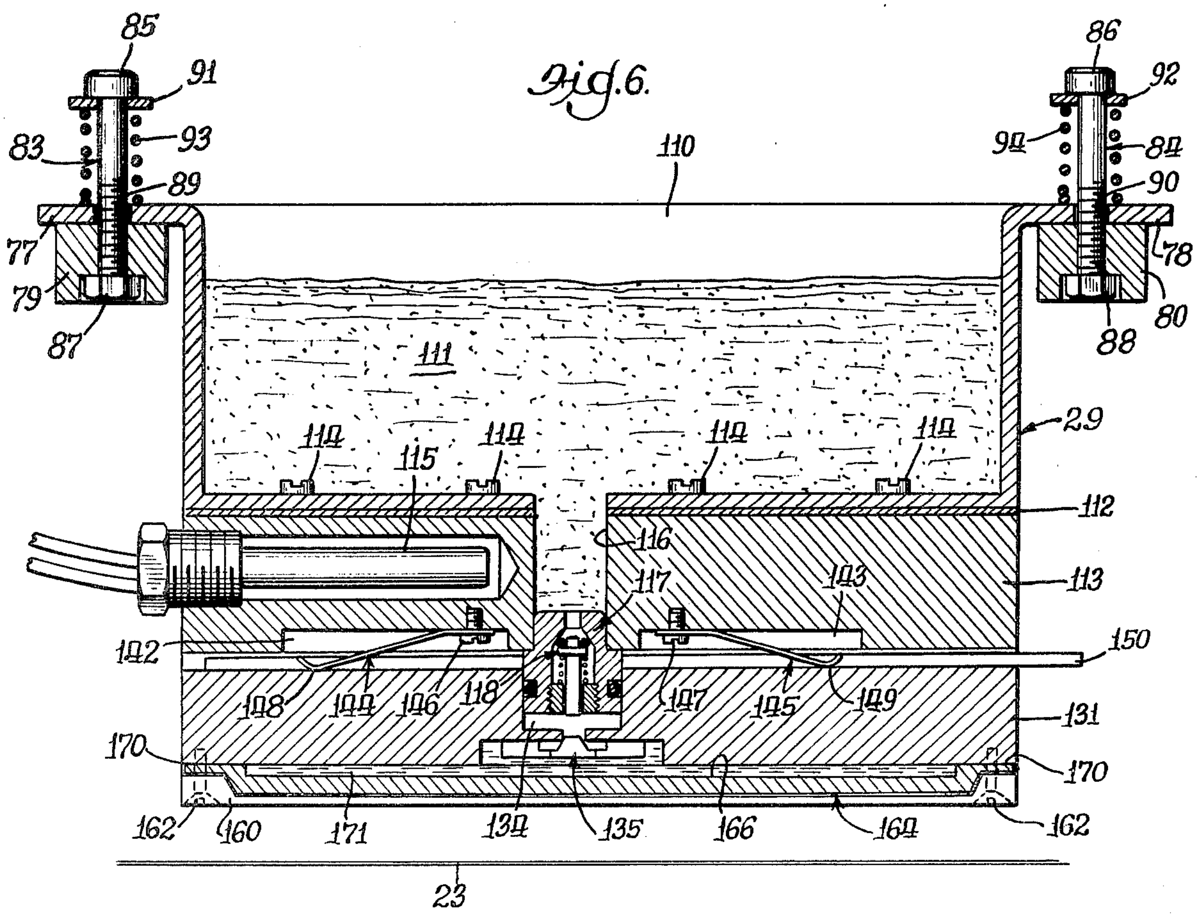
FIG. 6 is a sectional view taken on the line 6—6 of FIG. 2.

As best shown in FIG. 6, a shallow recess 142 is provided in the underside of the upper manifold 113 at a location generally to one side of the central well 116. Similarly another shallow recess 143 is provided in the bottom side of the upper manifold 113 at a location on the other side of the central well 116. The shallow recess 142 houses a leaf spring 144 while the other shallow recess 143 houses a leaf spring 145. A screw 146 is adapted to attach one end of the leaf spring 144 in the recess 142 by its threaded engagement in the upper manifold 113. Similarly a screw 147 is adapted to attach one end of the leaf spring 145 in the recess 143 by its threaded engagement with the underside of the upper manifold 113. A free end 148 of the leaf spring 144 extends downwardly beneath the confines of the shallow recess 142 and engages the top side of the lower manifold 131. Similarly a free end 149 of the leaf spring 145 projects down below the confines of the shallow recess 143 for a similar contact with the upper surface of the lower manifold 131. The leaf springs 144 and 145 thus act to urge maximum separation of the lower manifold from the upper manifold.

A piston displacement gauge 150 is adapted to slide inwardly from one end of the applicator at a location between the upper and lower manifolds 113 and 131. The thickness of the gauge 150 is used to control the amount of liquid adhesive to be dispensed by the applicator of this invention. Thus, various thicknesses of gauges 150 may be employed in the applicator depending upon the amount of liquid adhesive it is desired to dispense.

Figure 8:
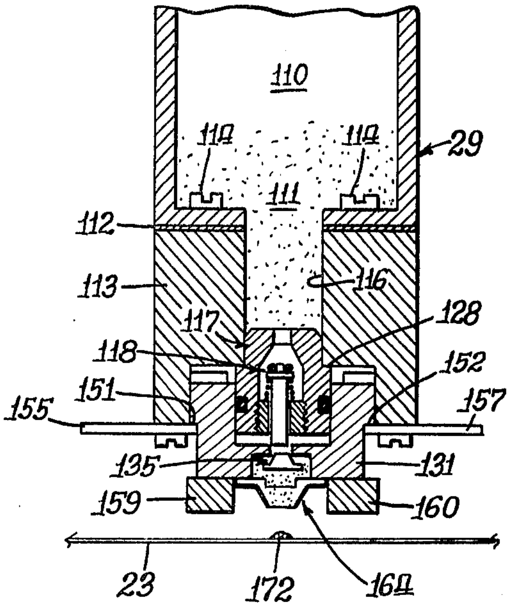
FIG. 8 is still another sectional view similar to FIG. 5 but in a position following the adhesive application.
Figure 9:
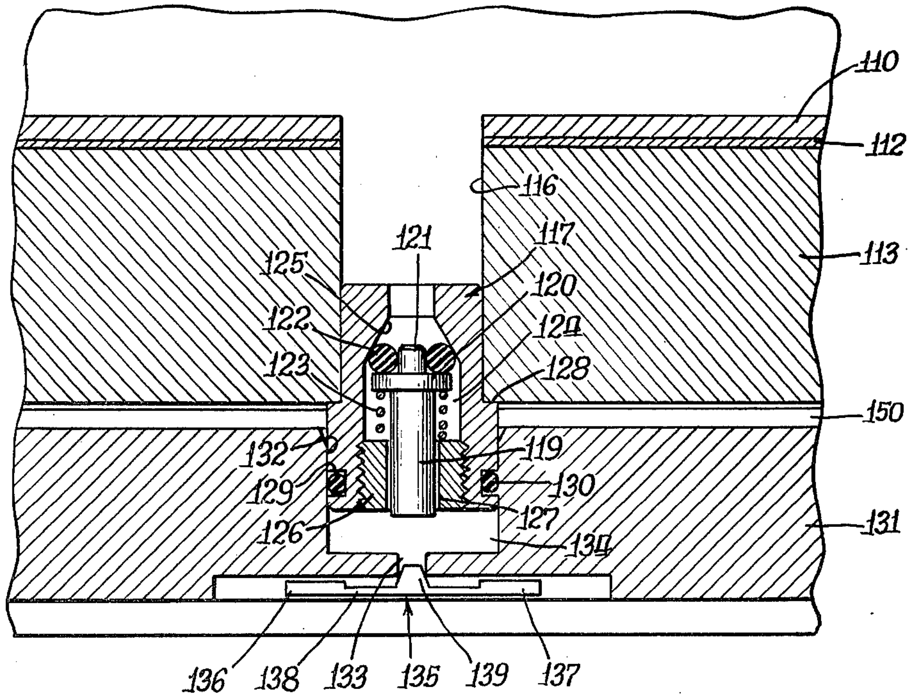
FIG. 9 is an enlarged sectional view taken through a portion of the adhesive applicator but with the lower check valve shown unattached for better understanding of its construction and the view being generally on the line 9—9 of FIG. 5.

As best shown in FIG. 8 the lower manifold 131 is provided with an offset shoulder extending along the front side of the applicator 29. Similarly an offset shoulder 152 is provided along the rear side of the lower manifold 131. The upper manifold 113 is provided with a depending skirt 153 along its front side. The lower end of the skirt 153 is disposed closely adjacent the offset shoulder 151 of the lower manifold 131. Similarly the upper manifold is provided with a spaced apart skirt 154 extending along its rear side. The lower end of the skirt 154 terminates closely adjacent the offset shoulder 152 in the lower manifold 131. Retainers 155 are fastened by means of screws 156 threadedly engaging the underside of the depending skirt 153. The bar shaped retainers 155 are pivotally mounted about their screw fastening elements 156 in a manner so they may have their inner ends swung into or out of engaging position with the underside of the offset shoulder 151. When the retainers engage the shoulder they act to hold the lower manifold 131 in its relation with the upper manifold 113. Similarly retainers 157 are adapted to be fastened by screws 158 to the underside of the depending skirt 154 of the upper manifold 113. These retainers 157 act to hold the other side of the manifold in its relationship to the upper manifold. The retainers 157 are similarly pivoted about their screw fastening elements 158 and may be manually swung into shoulder engagement position or shoulder disengagement position. When the retainers 155 and 157 are manually swung to a position out from under the shoulders 151 and 152 the lower manifold may be dropped out of the assembly and a different manifold with a different size or style of liquid dispenser may be inserted in lieu thereof.

A side strip member 159 is located on the underside of the lower manifold 131 as shown in FIG. 5 and acts as a foot or stand for the front side of the applicator 29. Similarly a strip member 160 is disposed on the rear side of the underside of the lower manifold 131 and acts as a spaced apart foot or surface engaging element of the applicator 29. Further, as shown in FIG. 5, countersunk screws 161 are adapted to threadedly engage the foot member 159 and hold that foot strip to the underside of the lower manifold. Similarly, countersunk screws 162 threadedly engage the rear strip foot 160 and hold the strip 160 to the manifold.

Figure 13:
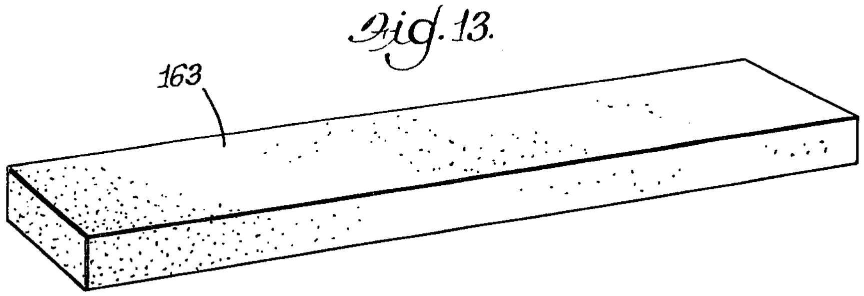
FIG. 13 is a rectangularly shaped strip of porous flexible plastic material.
Figure 14:
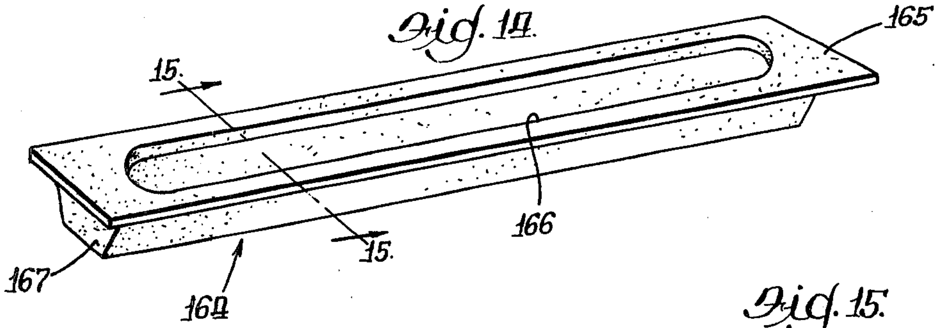
FIG. 14 is a view of the strip of FIG. 13 after it has been compressed in selected portions thereof to eliminate its porosity in those selected portions.
Figure 15:
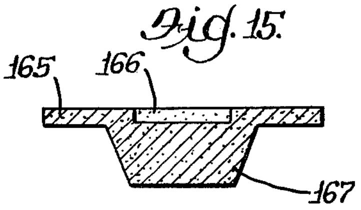
FIG. 15 is an enlarged sectional view taken on the line 15—15 of FIG. 14.
Figure 16:
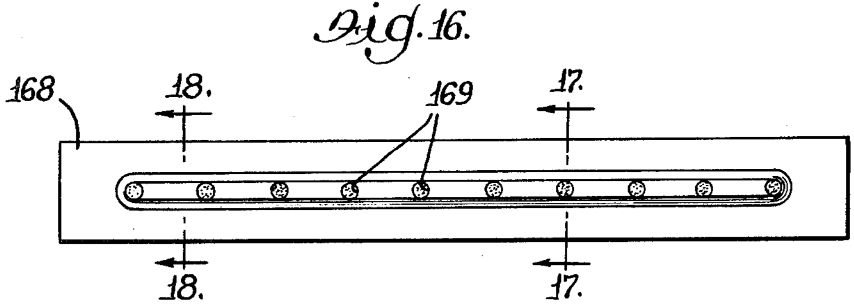
FIG. 16 is a bottom plan view of the formed strip of FIG. 14 following the application of a liquid impervious coating thereto in selected areas.
Figure 17:
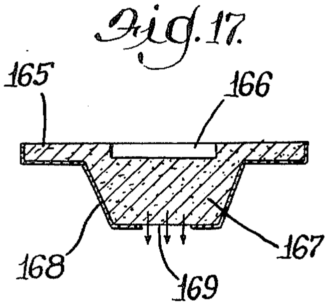
FIG. 17 is an enlarged sectional view taken on the line 17—17 of FIG. 16.
Figure 18:
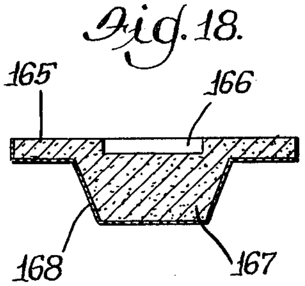
FIG. 18 is still another enlarged sectional view taken on the line 18—18 of FIG. 16.

A liquid dispensing element is located at the bottom of the applicator 29 between the surface engaging spaced apart feet members 159 and 160. FIG. 13 shows a rectangular strip of flexible, porous, plastic material 163. In the unworked state of FIG. 13 the porous material 163 permits flow of a liquid adhesive or a wax therethrough. It is this material that is used as the discharging strip for the liquid wax used in the stencil tabber of this invention. As shown in FIG. 14 the rectangular strip of flexible, porous plastic material 63 has been formed into a particular discharging strip shape as designated by the numeral 164. Portions of the porous plastic material 163 have been retained with the same porosity of the material in those portions while other portions have been condensed or permanently compressed to either eliminate or greatly reduce the porosity of those portions. The new shape of the wax deposit strip 164 includes a highly compressed dense perimeter flange 165, a central rectangularly shaped shallow well 166, and a still porous central portion 167 depending downwardly with inwardly tapering sides. The well 166 constitutes the applicator chamber of this device. The liquid adhesive starts in the storage chamber 110 at the top of the applicator and from there moves to the intermediate metering chamber 134. From the metering chamber 134 the liquid adhesive is delivered to the applicator chamber below the lower check valve let and confined by the well 166. It is through this porous central portion 167 that liquid adhesive is passed in the operation of the device of this invention. Thus the single piece of material 163 has now been formed into the shape 164 of FIG. 14 and with differentials in the porosity of various portions of that single strip of material the device is capable of dispensing uniform and measured quantities of liquid adhesive. As best shown in FIG. 16, 17 and 18 the formed strip 164 has had a thin outer wax impervious coating 168 applied thereover in a particular desired pattern. The bottom plan view of FIG. 16 shows a series of circular openings left uncovered by the coating 168 in the bottom of the fully porous central portion 167 of the wax deposit strip 164. Whereever the wax impervious outer coating 168 is used it prevents the passage of any liquid through the deposit strip 164. However, the coating 168 does not cover the circular openings 169 and thus wax or other liquid adhesive may be discharged from the position of each of the circular openings 169. It should be understood that the pattern of a series of dots or circular openings through which wax is discharged may be changed to any desired pattern of dots, dashes, or lines of any outline. However, in the present instance it is desirable and has been found effective to discharge the wax to be used as an adhesive in a series of dots for the purpose of effectively fastening a stencil to a multi-leaved business form.

As best shown in FIG. 8 a wax deposit dot 172 is shown on the business form 23. This wax dot 172 was discharged from one of the circular openings 169. The wax of the dot was obtained from the storage chamber 110, passing through the upper manifold 113, coming down through the piston 117, and thence through the lower manifold 131 and into and through the wax deposit strip 164.

Figure 11:
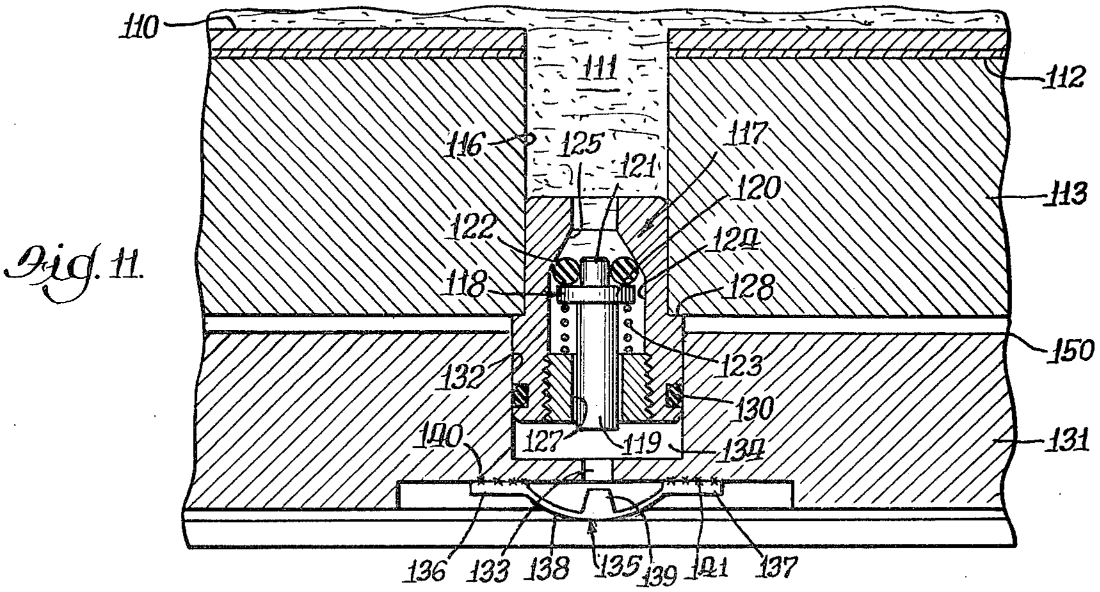
FIG. 11 is another sectional view similar to FIGS. 9 and 10 but in an adhesive discharging position.

In the operation of the stencil tabber of this invention a solid microcrystalline wax is placed in the storage compartment or reservoir 110 whereupon the action of the heating element 115 converts the solid wax to a liquid. When the wax is in its liquid form it has unobstructed access through the well 116 in the upper manifold 113 to the top of the upper check valve 118 within the piston 117. The piston extends down into the well 132 of the lower manifold 131 and terminates at a position immediately above the wax metering chamber 134. The wax deposit unit 29 is caused to contact the surface of the paper web 23 by the rise and fall mechanism occasioned by the cam rollers 73 and 74 riding in the track cams 69 and 70 respectively as shown in FIGS. 3 and 4. Engagement of the applicator 29 with the adhesive depositing surface drives the lower manifold 131 upwardly as far as the piston displacement gauge 150 will permit. As previously stated the thickness of the gauge 150 determines the amount of wax or other liquid adhesive to be discharged from this mechanism. A thinner gauge will occasion more wax or other liquid adhesive to be discharged whereas a thicker gauge will reduce the amount of wax to be discharged. This upward sliding movement of the lower manifold 131 causes the pressure in the wax chamber 134 to increase thus forcing the lower check valve 135 to open as shown in FIG. 11. With the check valve 135 open wax is allowed to reach the access channel or well 166 in the wax deposit strip 164. The wax deposit strip 164, as previously stated, is made of a flexible porous plastic material. This material may be an open cell material such as polyurethane foam. The pattern along the bottom of the noncompressed and still porous central portion 167 of the strip 164 as identified by the absence of the wax impervious coating 168 will cause a deposit of molten wax in the shape of the pattern onto the paper form 23.

Figure 10:
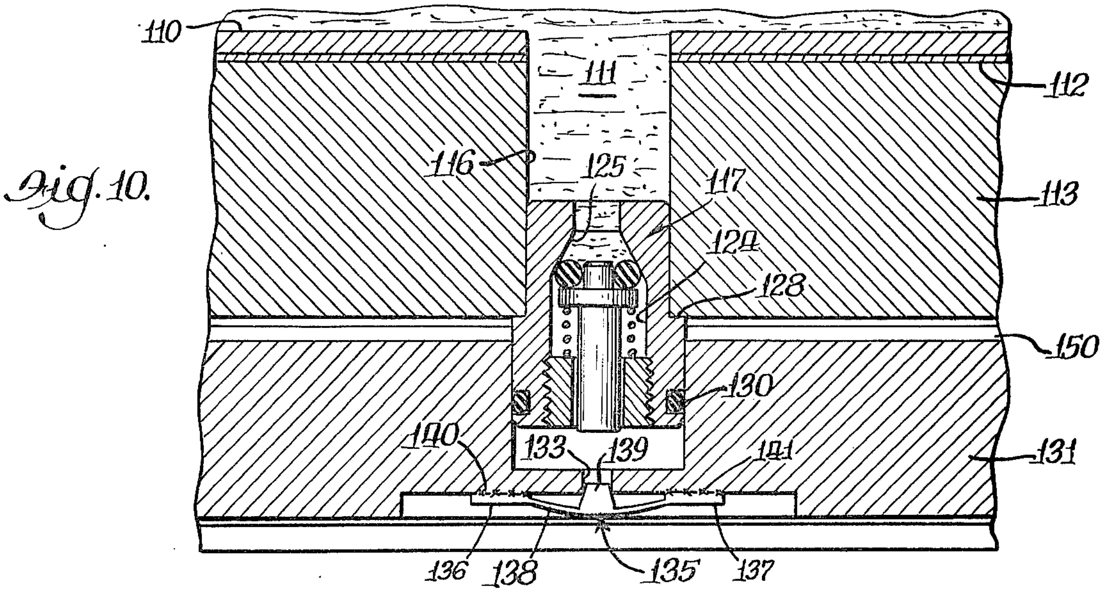
FIG. 10 is a sectional view similar to FIG. 9 and showing the lower check valve bonded to the lower manifold.

FIGS. 5, 6, and 10 depict the wax applicator 29 in an "at rest" position. The leaf springs 144 and 145 act to hold the lower manifold 131 against the retainers 155 and 157 in this "at rest" position. Also, in the "at rest" position the upper check valve 118 and the lower check valve 135 are both closed and the molten wax 111 is in a state of balanced pressure. It is at this time that the paper web indexes or is advanced a uniform distance in the machine.

Figure 7:
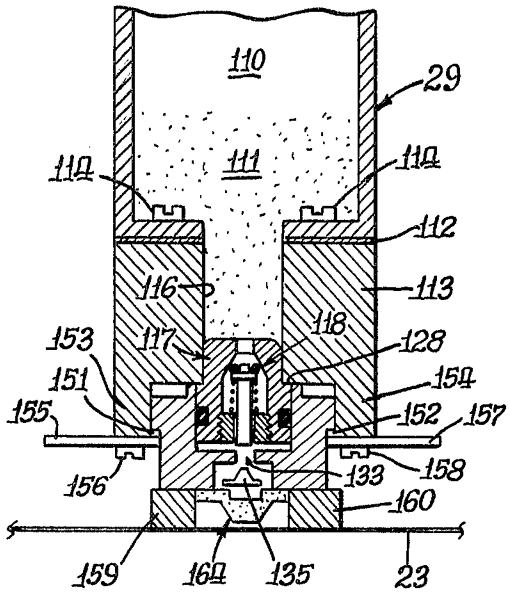
FIG. 7 is a sectional view similar to FIG. 5 but in an adhesive applying position.

FIGS. 7 and 11 show the applicator 29 in its wax application position. The lower manifold 131 has been driven upward as far as the lower manifold gauge 150 will permit. This upward movement causes an increase in the pressure in the wax chamber 134, forcing open the lower check valve 135. With the check valve 118 closed, wax in the chamber 134 is permitted to move through the opening 133 in the lower end of the manifold 131 and into the elongated distribution well 166 in the wax deposit strip 164. The displacement of wax from the chamber 134 to the channel 166 in the wax deposit strip is by an effective pumping action of the relative movement of the lower manifold to the upper manifold. This wax continues under pressure and is forced through the porous portion 167 of the wax deposit strip and onto the paper web 23. The placement of wax on the multi-leaved business form 23 is identical to the pattern formed on the lower surface of the central portion 167 of the wax deposit strip 164. The thickness of the dot or other shape of wax deposit is determined in part by the difference in the thickness between the wax deposit strip and the lower manifold feet 159 and 160 and in further part by the thickness of the piston displacement gauge 150.

Figure 12:
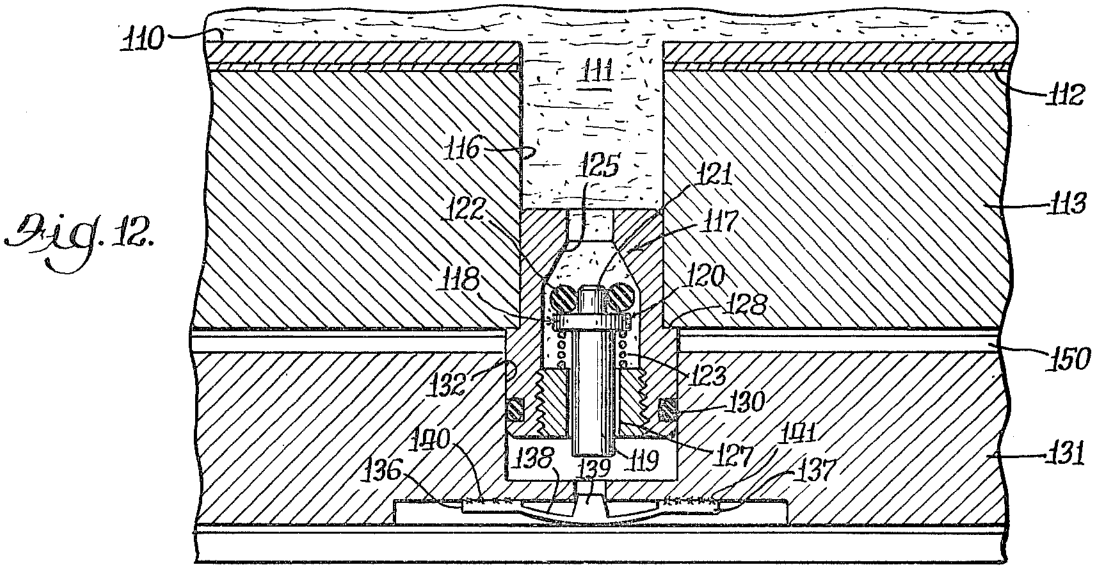
FIG. 12 is still another sectional view similar to FIGS. 9, 10 and 11 but in a position following the adhesive application.

FIGS. 8 and 12 show the applicator unit 29 during its return stroke and going back to the "at rest" position of FIGS. 5, 6, and 10. In FIGS. 8 and 12 the lower check valve 135 has resumed its closed position, the manifold return leaf springs 144 and 145 are forcing the lower manifold 131 downwardly thus reducing the pressure in the wax chamber 134 to an amount less than the atmospheric pressure acting in a downward direction to open the upper check valve 118. The atmospheric pressure on the storage chamber 110 in excess of the reduced pressure in the wax chamber 134 causes the upper check valve 118 to open with the O-ring 122 moving downwardly away from its tapered seat 125 in the vertical channel 124 within the piston 117. With the opening of the upper check valve, molten wax is permitted to refill the wax metering chamber 134 at which time the check valve return spring 123 and the newly increased pressure in the wax chamber acts to close the upper check valve 118. The unit is now ready for a repeat stroke.

It will thus be apparent that the rise and fall of the wax applicator creates a pumping action which is adapted to meter a controlled amount of wax for delivery and deposit onto a paper web surface. The open cell material 163 of the wax deposit strip 164 controls the flow of molten wax. The porosity of the central portion 167 of the wax deposit strip 164 is such that it will not permit wax or other liquid to flow freely therethrough except when the liquid is under pressure. When the proper pressure is applied to the liquid, such as that obtained from the pumping mechanism of this device, wax will flow evenly through the wax deposit strip in the uncoated pattern throughout its entire length. The wax is thus metered evenly for its desired pattern onto the paper form 23.

The device of this invention permits the exact and repetitive control of the shape and thickness of the wax pattern as it is deposited onto a surface, such as the surface of a multi-leaved paper business form 23. If it is desired to change the wax pattern it is preferable that the lower manifold 131 be removed by manually swinging the retainers 155 and 157 out from under the enlarged shoulders 151 and 152 so the manifold can be dropped downwardly away from the upper manifold 113 and replaced by a manifold having a different pattern.

A particular advantage of this device over previous devices of this type is that the applicator 29 need not be cleaned out after each use because the microcrystalline wax when cooled does not oxidize. To resume operation the heat is turned on causing the wax in the chamber 110 to melt and the machine is again operable.

I am aware that numerous details of construction can be varied throughout a wide range without departing from the principles disclosed herein and I therefore do not propose limiting the patent granted hereon otherwise than as necessitated by the appended claims.

What is claimed is:

1. An apparatus for tabbing margin punched business forms with stencils comprising a frame support, a generally flat bed on said frame support, means delivering a continuous strip of said margin punched business forms with transverse perforations longitudinally along said bed, means on the apparatus for engaging said punched margins of said forms and accurately and uniformly moving said continuous forms along said bed, a liquid adhesive applicator disposed above said bed and over said continuous forms at a first station, means moving said applicator in a vertical reciprocating action in a manner when the applicator is in its down position it engages said continuous forms and deposits a quantity of liquid adhesive thereon, means delivering a continuous strip of stencils transversely across said bed at a second station spaced from said first station, means at said second station for depositing one of the continuous strip of stencils onto the liquid adhesive previously deposited on said continuous forms at the first station, and means removing the stencil tabbed business forms from the bed at the end thereof opposite the incoming continuous strip of business forms.

* * * * *